UNITED STATES PATENT OFFICE.

D. AUSTIN BROWN, OF BOSTON, MASSACHUSETTS.

PLASTIC-CEMENT MIXTURE FOR NON-CONDUCTING COVERINGS FOR BOILERS, &c.

SPECIFICATION forming part of Letters Patent No. 311,287, dated January 27, 1885.

Application filed July 10, 1883. (No specimens.)

*To all whom it may concern:*

Be it known that I, D. AUSTIN BROWN, of Boston, county of Suffolk, and State of Massachusetts, have invented an Improvement in Plastic-Cement Mixture, of which the following is a description.

The object of this invention is the production of an improved plastic-cement mixture for various purposes, especially adapted to be used as a non-conductor of heat. Infusorial earth is a most excellent non-conductor of heat, because of its peculiar structure or composition; but it is so fine that when used by itself it hardens and cracks; so to obviate such crack, and yet make its heat-resisting qualities available, I mix with said earth a quantity of lime and asbestus, which latter, being fire-proof, does not burn out when the earth is heated, as would hair if used.

In order to produce a plastic-cement mixture suitable for use as a covering for hot pipes in connection with boilers or furnaces, I mix together a compound of asbestus and infusorial earth, in proportion of about twenty-five to thirty-three per cent. of the former to about seventy-five to sixty-six per cent. of the latter, adding lime as a cementitious matter in quantities to suit—as, for instance, four parts of lime to six of infusorial earth.

This cement may be applied in a plastic state directly to the pipe or surface to be shielded, or in any other manner in which it is customary to apply what is known as "lime putty," and the said mixture may be used to advantage in places where it is customary to use asbestus or lime putty as a protection against radiation of heat or injury from heated pipes or surfaces.

The described cement mixture may be pressed or molded to proper shape to fit the surface to be covered, and the covering sections so produced may be bound upon the pipes or surfaces in any usual manner.

I disclaim the invention of a plastic-cement mixture composed of asbestus and infusorial earth, and also a non-conducting molded covering-section consisting of a cement mixture composed of infusorial earth and asbestus.

I am aware that it is old to make a fire-proof material of infusoria, (*Diatomaceæ*,) a cohesive agent containing sulphuric acid, fire-clay, and asbestus, and silica.

I am also aware that it is old to line safes with silicated paper and a filling of infusorial earth. These things form no part of my invention, nor is the use of infusorial earth *per se* as a fire-proof or non-conducting agent my invention; but

I claim—

1. A plastic-cement mixture composed of infusorial earth, lime, and asbestus, substantially as described.

2. A non-conducting molded covering-section consisting of a cement mixture composed of infusorial earth, lime, and asbestus, substantially as described.

In testimony whereof I have signed my name to this specification in the presence of two subscribing witnesses.

D. AUSTIN BROWN.

Witnesses:
 JOS. P. LIVERMORE,
 B. J. NOYES.